June 13, 1939. E. D. MOSHER 2,162,104
FLUID SEAL
Filed Aug. 5, 1936
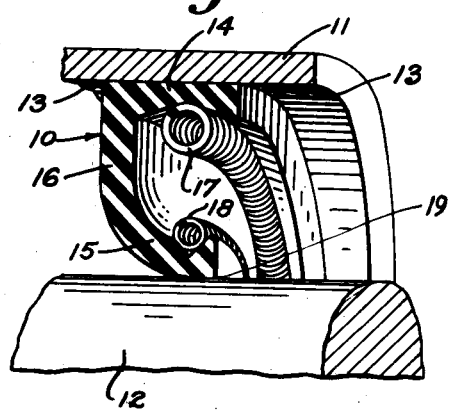
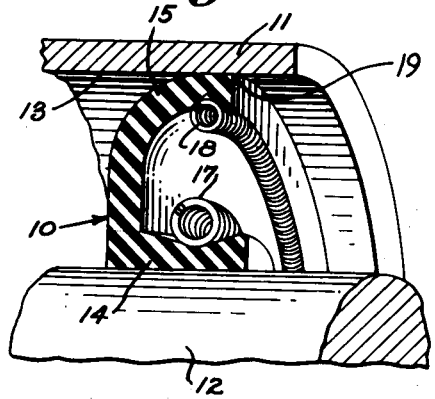
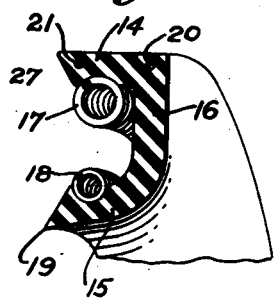
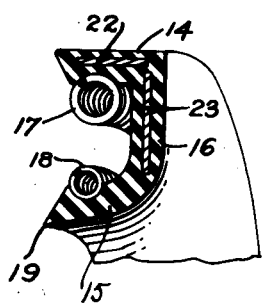
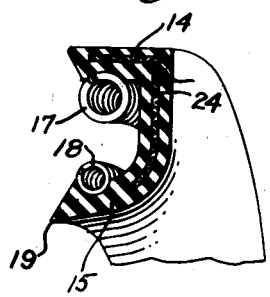
INVENTOR.
EZRA D. MOSHER
BY
ATTORNEY Patented June 13, 1939

2,162,104

UNITED STATES PATENT OFFICE 2,162,104

FLUID SEAL

Ezra D. Mosher, Oakland, Calif., assignor to National Oil Seal Co., Oakland, Calif., a corporation of Nevada Application August 5, 1936, Serial No. 94,378

1 Claim. (Cl. 288—1)

My invention relates to sealing devices.

The growing realization of the importance of proper lubrication of bearing surfaces in frictional contact has led to an increasing use of some form of sealing means adapted to seal lubricant into the bearing and also prevent its loss from the housing through leakage along the shaft or the housing wall. There are two general types of installations today in machine construction which require some form of an annular sealing means between the shaft and the opening in the housing from which it projects. One is where the annular sealing member engages the housing wall in a non-rotative fit, and has a wiping member in sliding contact with the shaft. The other is where the annular sealing member has a non-rotating fit on the shaft and a wiping lip in sliding contact with the wall of the housing.

The most common form of annular sealing means in use today is that typified by the Johnson Patent No. 2,031,956, and in which the sealing means comprises a metal cage and a flexible sealing member housed within this cage. The metal cage is usually press-fitted into the housing bore, or on the shaft, to form a non-rotative fit therewith. It is necessary in installing these sealing devices having a metal cage, that they be put into the housing under considerable pressure so as to accomplish a secure and leak-tight fit between the cage and the part against which it bears. In factories, where the devices are installed as original equipment, the practice is to employ a hydraulic press; but in shops, where such sealing means must be replaced in service, the practice generally is to employ a special tool which must fit the cage accurately. This tool is given a series of heavy blows with a hammer to force the seal into operative position in the housing. Similarly, when it is necessary, in service, to remove a sealing member, considerable difficulty is experienced in extracting the metal cage from the housing bore, and invariably this extraction process results in the complete destruction of the cage and sealing unit, and not infrequently causes a scoring of the wall or housing, which leads to leakage around such score marks.

One object of my invention is to provide an annular sealing device which gets away from the above-described installation difficulties, and which can be put in place or removed by the application of very light pressure.

Another object of my invention is to provide a one-piece seal for insertion in an annular opening, said seal having spring means to prevent body rotation and another spring means to contract the wiping member.

Another object of my invention is to provide a one-piece annular sealing member having its opposite walls of different widths to provide a non-rotative fit with one concentric wall of the opening, and a sliding fit with the other wall.

Another object of my invention is to provide a sealing member capable of insertion in a very narrow shaft-to-housing space and in which the springs are not in radial alignment.

Another object of my invention is to provide a molded one-piece sealing member having a pair of oppositely acting springs.

With this and other objects in view, the various features of the invention consist in the novel features of construction, combinations and arrangements of parts hereinafter described and claimed, the advantages of which will be obvious to those skilled in the art from the following description.

In the accompanying drawing, illustrating the preferred form of the invention and several modifications, similar reference numerals have been employed for like parts in the several figures:

Fig. 1 represents a cross section view through one form of seal of my invention, showing it in a housing and bearing on a shaft, a portion of the seal being shown in perspective;

Fig. 2 is a similar view showing the arrangement of parts where the seal is secured to the shaft instead of to the housing bore;

Fig. 3 is a cross section of a modification of my invention;

Fig. 4 is a cross section view of another modification; and

Fig. 5 is a cross section view of still another modification.

The form of construction shown in Fig. 1 is typical of my invention when adapted for installations where the space between the shaft and the housing wall is not too narrow. In this case, the seal, generally designated by the numeral 10, is secured inside a housing 11, with a non-rotating fit. This fit is usually what is known as a radial pressure fit, that is, the seal 10 is maintained in a non-rotative position in the housing by means of the outward pressure bearing against the inside of the housing. How this pressure is obtained in the present seal will be explained as this description proceeds.

12 designates the usual shaft projecting from inside the housing 11. The function of the seal 10 is to confine whatever lubricant or fluid content may be in the housing, and to prevent the fluid from escaping, either along the shaft 12, or between the outer periphery of the seal base 14 and the inside wall 13 of the housing.

The form of my invention shown in Fig. 1 is comprised of a body portion 10, usually made of a soft, pliable, rubber-like, resilient, lubricant-resisting material, the base portion 14 adapted for a non-rotative fluid tight fit with the housing wall 13, the axial portion 15 having the lip 19 adapted to make a light pressure fit on shaft 12, and the gland or flexing portion 16 which connects lip 15 to base 14. Gland 16 permits the axial lip portion 15 to have a considerable sidewise movement such as exists where the shaft 12 does not run true in the housing 11.

One feature of my invention is to have the base 14 made of a resilient and pliable material. Its diameter, at its periphery, with spring 17 removed, preferably closely approximates that of the bore 13. Being fairly pliable, the seal 10 may be inserted in the housing bore without a great deal of force being applied to it. If it is of larger diameter than the bore 13, it will readily contract to the size of the bore and can be slid along the bore to the proper operating position without the use of excessive force or special presses.

As a safeguard against the loosening of the fit between base 14 and housing wall 13, I provide the spring 17 which may be of the helical form as shown, or of any other suitable form. This spring is of a tension just strong enough to maintain a gentle outward pressure on the base 14 so as to keep it in a non-rotative, fluid-tight fit with wall 13. This spring 17 should not be too heavy, otherwise it will cause "cold flow" of the material forming base 14 and gradually embed itself therein to the extent that it will cease to function for its intended purpose.

In order to insure a light pressure fluid-tight sliding fit of lip 19 on shaft 12, I provide another spring 18, which may be of the garter spring or helical type, as shown, or of any other desired type. It is important, however, that spring 18 shall be of lesser tension than spring 17, or that the combined frictional effect produced by spring 18 and lip 19 on shaft 12, shall not equal the combined frictional effect of spring 17 and base 14 on wall 13. An important feature of my invention is that the two springs, one contractive, and the other expansive, together with the lip and base portions, respectively, shall have between them this difference in frictional effect so as to provide at the base portion a non-rotative fluid-tight fit. It is also preferable that the axial extent of base 14 in contact with housing 13 should exceed the axial extent of lip portion 19 in contact with the moving shaft 12.

In Fig. 2 I have shown the form which my invention takes where it is desired to seal against the bore 13 of the housing instead of against the shaft 12. In this type of installation, the base 14 of the sealing member is on the inner periphery and is maintained in fluid-tight non-rotative association with the shaft, by means of spring 17, and the lip 19 is maintained in fluid-tight rotative contact with wall 13 by means of the light expansive spring 18. In this type of installation the same features of construction hold true as already described, namely, that the spring 17 cooperating with the base 14 should combine with it to exert on the shaft 12 a greater frictional effect than that produced by the expansive spring 18 and lip 19 on the housing wall 13. Also, with the type of device shown in Fig. 2, where the base 14 is not of a rigid hard material and is not housed within a metal casing, it is possible, and in fact the usual practice, to slide it onto the shaft with a very light force. This makes not only for easy installation, but when it is desired to disassemble the mechanism, the sealing member can be easily removed, and without damaging it.

With my improved seal I have the relative strengths of springs 17 and 18 correlated to the base 14 and lip 19 on which they press, respectively, so that base 14 is kept from rotating and lip 19 bears on shaft 12 no harder than required to stop fluid flow along the shaft.

In Figs. 3, 4 and 5 I have shown three modifications of my invention, and these have to do principally with providing a form of reenforcement in base 14 to prevent any undue flowing of the material, and in gland 16 to strengthen it against the twisting effect imparted where shaft 12 is of the rotating type.

In Fig. 3, during the molding, or formation of the sealing member 10, wires 20 and 21, which may be of spring material or not, are molded into the base 14. When the wires 20 and 21 are of a spring wire material, the ends preferably are left in a lapped position, so that they too combine with spring 17 in urging the periphery of base 14 against the housing wall 13. The other parts of this seal are identical with the ones shown in Fig. 1.

In Fig. 4, the base portion 14 has molded in it at the time of manufacture, a metal strip or ring 22 which has its ends overlapped and unconnected, so that it will not interfere with the action of spring 17 in spreading the base 14 into a tight non-rotative fit with the housing wall 13. Also, in certain installations, where this device is sealing against a considerable pressure, and needs strengthening on the gland or neck portion 16, I mold into this portion a flat washer 23 which may be of fibrous material, or of thin metal, depending upon the designer's choice. This washer 23 may extend a slight distance into the base portion 14 and preferably will run down toward the lip portion to about where the latter begins to bend to form axial lip 15.

In the form shown in Fig. 5, I have embedded in the base portion 14 the fabric strip 24 which gives to the base portion 14 a stronger body to resist the outward expansive effort of spring 17 and prevents base 14 from spreading out unduly, from what is known as "cold flow". Instead of the fabric strip 24 being embedded in the base, it may be placed in the outside wall of the mold, and therefore in the final product, will be bonded to the composition and will form the outer periphery or surface of base 14. Also, this strengthening fabric radial insert 24 may extend into the gland portion 16 as shown in the drawing.

My invention lends itself particularly well to use in that form of installation where the distance between shaft 12 and housing wall 13 is at a minimum.

While I have illustrated my improved seal independent of any outer casing or cage such as is used today and usually made of cold rolled steel or brass, it is obvious that my seal is capable of being inserted in such a housing when desired and then the cage can be press-fitted into the housing in the well-known manner. Even when my seal is used in this manner inside of a metal cage, which is press-fitted into the housing, it accomplishes distinct advantages over the present day type of seal, because, the spring 17, exerting its pressure in combination with the expansive force of base 14 assures a leak-tight non-rotative joint with the inner wall of the cage. These are both features which are difficult to obtain with many of the present day seals, except where the sealing member is bonded to the metal cage.

It is also intended in certain installations that the base portion 14 may be made of a material slightly harder than gland 16 and lip 19; or, the hardened portion may extend from the base substantially through the gland 16 with axial portion 15 and lip 19 made of more resilient material and free to flex as the shaft 12 may wobble or be deflected. In either of the above cases, however, the base 14 is not made so hard as to be unaffected by spring 17 in expanding it into a tight fit with housing 13.

The above description is intended to set forth the general principles of my invention, and several of the many forms in which it can be embodied. I do not wish to be limited, however, to these forms except as required by the appended claim, realizing full well the many modifications which can be made and still retain the essence of my invention.

What I claim is:

A one-piece fluid seal adapted to be interposed directly between a cylindrical housing and a shaft for establishing a fluid tight seal therebetween consisting solely of a deformable self-sustaining flexible rubber-like molded sealing member, and a pair of springs, said sealing member comprising a pair of spaced annular flanges extending in the same axial direction and a flexible web interconnecting said flanges, each of said springs engaging one of said flanges, one of said springs pressing its associated flange into direct sealing contact with said housing, and the other of said springs pressing its associated flange into sealing contact with said shaft.

EZRA D. MOSHER.